(12) United States Patent
Giuliani et al.

(10) Patent No.: US 11,672,207 B2
(45) Date of Patent: Jun. 13, 2023

(54) AGRICULTURAL VEHICLE WITH GUIDED ROTOR KNIVES

(71) Applicant: CNH Industrial America LLC, New Holland, PA (US)

(72) Inventors: Enrico Giuliani, Russi-RA (IT); Chandrashekhar Singh, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 563 days.

(21) Appl. No.: 16/806,371

(22) Filed: Mar. 2, 2020

(65) Prior Publication Data

US 2021/0267131 A1 Sep. 2, 2021

(51) Int. Cl.
- *A01F 29/08* (2006.01)
- *A01F 15/10* (2006.01)
- *A01F 29/09* (2010.01)

(52) U.S. Cl.
CPC .............. *A01F 29/08* (2013.01); *A01F 15/10* (2013.01); *A01F 29/095* (2013.01); *A01F 2015/107* (2013.01); *A01F 2015/108* (2013.01)

(58) Field of Classification Search
CPC ........ A01F 29/08; A01F 15/10; A01F 29/095; A01F 2015/107; A01F 2015/108; A01F 15/106

See application file for complete search history.

(56) References Cited

U.S. PATENT DOCUMENTS

| | | | |
|---|---|---|---|
| 6,769,239 B1 | 8/2004 | Webb | |
| 6,912,835 B1* | 7/2005 | Chabassier | A01F 15/10 241/243 |
| 7,404,284 B2 | 7/2008 | Viaud et al. | |
| 8,205,424 B1* | 6/2012 | Lang | A01F 29/02 56/341 |
| 2016/0057937 A1* | 3/2016 | McClure | A01F 15/08 56/341 |
| 2016/0219790 A1* | 8/2016 | McClure | A01F 15/106 |
| 2020/0093068 A1* | 3/2020 | Claeys | A01F 15/10 |
| 2021/0267129 A1* | 9/2021 | McClure | A01F 15/10 |

FOREIGN PATENT DOCUMENTS

| | | | | |
|---|---|---|---|---|
| DE | 202014106256 U1 * | 4/2015 | | A01D 90/04 |
| EP | 0 584 473 B1 | 10/1996 | | |
| EP | 0 689 760 B1 | 4/1999 | | |
| EP | 3275303 A1 * | 1/2018 | | A01D 90/04 |
| EP | 3874935 A1 * | 9/2021 | | A01F 15/0715 |
| KR | 10-1997159 B1 | 7/2019 | | |

* cited by examiner

*Primary Examiner* — Arpad F Kovacs
(74) *Attorney, Agent, or Firm* — Peter K. Zacharias (57) ABSTRACT

A cutting assembly includes: a rotor having extensions; a rotor floor disposed adjacent to the rotor and having knife slots formed therein, the rotor floor defining a cutting side and a shielded side on the opposite side of the rotor floor; movable knives that each extend through a respective knife slot into the cutting side to cooperate with the extensions in a cutting position and are disposed on the shielded side such that the knives do not cooperate with the extensions in a retracted position; and a knife guide including a pair of spaced apart guide surfaces coupled to the rotor floor on the shielded side and defining a gap therebetween. A respectively associated knife is at least partially disposed in the gap when in the retracted position. At least one of the guide surfaces defines a curved shape that corresponds to a cutting edge profile of the associated knife.

18 Claims, 10 Drawing Sheets

AGRICULTURAL VEHICLE WITH GUIDED ROTOR KNIVES

BACKGROUND OF THE INVENTION

The present invention pertains to agricultural vehicles and, more specifically, to agricultural vehicles with rotor knives.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting assembly, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting assembly. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

The cutting assembly includes knives that cut crop material fed toward the knives by a rotor or other conveyance device. As crop material is fed toward the knives, the knives cut the crop material into smaller pieces. In some instances, the knives are unable to properly cut crop material entering the baler.

What is needed in the art is a way to reliably cut crop material entering an agricultural vehicle.

SUMMARY OF THE INVENTION

Exemplary embodiments provided according to the present disclosure include a knife guide with one or more guide surfaces that define a curved shape corresponding to a cutting edge profile of a knife disposed in a gap of the knife guide when the knife is in a retracted position.

In some exemplary embodiments provided in accordance with the present disclosure, a cutting assembly for an agricultural vehicle includes: a rotatable rotor having a plurality of extensions; a rotor floor disposed adjacent to the rotor, the rotor floor having a plurality of knife slots formed therein, the rotor floor defining a cutting side on the side of the rotor floor facing the rotor and a shielded side on the opposite side of the rotor floor; a plurality of movable knives disposed adjacent to the rotor floor, the knives each being movable from a cutting position to a retracted position, the knives each extending through a respective knife slot into the cutting side to cooperate with the extensions in the cutting position and being disposed on the shielded side such that the knives do not cooperate with the extensions in the retracted position; and at least one knife guide including a pair of spaced apart guide surfaces coupled to the rotor floor on the shielded side and defining a gap therebetween such that a respectively associated knife is at least partially disposed in the gap when in the retracted position, at least one of the guide surfaces defining a curved shape that corresponds to a cutting edge profile of the respectively associated knife.

In some exemplary embodiments provided in accordance with the present disclosure, an agricultural baler includes: a chassis; a pickup carried by the chassis and configured to convey crop material; and a cutting assembly carried by the chassis and configured to cut crop material conveyed by the pickup. The cutting assembly includes: a rotatable rotor having a plurality of extensions; a rotor floor disposed adjacent to the rotor, the rotor floor having a plurality of knife slots formed therein, the rotor floor defining a cutting side on the side of the rotor floor facing the rotor and a shielded side on the opposite side of the rotor floor; a plurality of movable knives disposed adjacent to the rotor floor, the knives each being movable from a cutting position to a retracted position, the knives each extending through a respective knife slot into the cutting side to cooperate with the extensions in the cutting position and being disposed on the shielded side such that the knives do not cooperate with the extensions in the retracted position; and at least one knife guide including a pair of spaced apart guide surfaces coupled to the rotor floor on the shielded side and defining a gap therebetween such that a respectively associated knife is at least partially disposed in the gap when in the retracted position, at least one of the guide surfaces defining a curved shape that corresponds to a cutting edge profile of the respectively associated knife.

One possible advantage that may be realized by exemplary embodiments provided according to the present disclosure is that the knife stays within the gap when being moved between the cutting position and the retracted position to stabilize knife movement and reduce the risk of the knife not properly moving.

Another possible advantage that may be realized by exemplary embodiments provided according to the present disclosure is that the curved shape of one or both of the guide surfaces allows the knife to stay within the gap even after repeated sharpening of the knife.

Yet another possible advantage that may be realized by exemplary embodiments provided according to the present disclosure is that the knife guide, and in some embodiments a pivot guide as well, reduces the risk of trash and debris accumulation negatively impacting operation of the cutting assembly.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
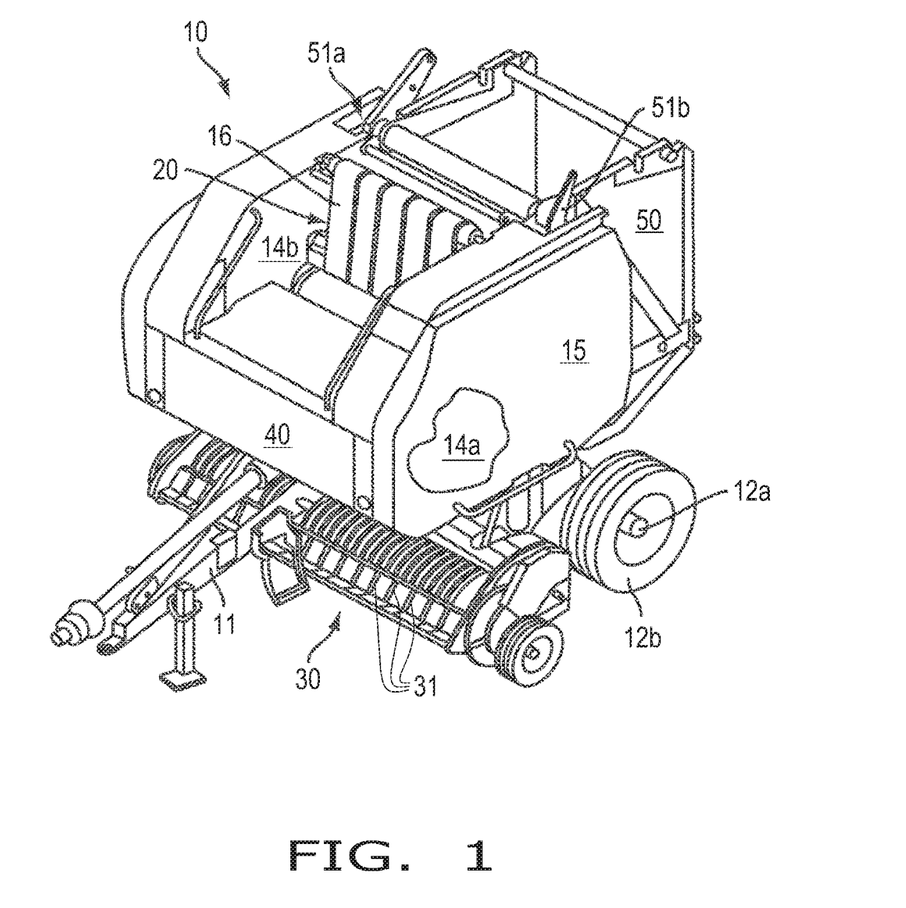
FIG. 1 illustrates a perspective view of an exemplary embodiment of an agricultural baler including a cutting assembly, provided in accordance with the present disclosure.

Referring now to the drawings, and more particularly to FIG. 1, an exemplary embodiment of an agricultural vehicle 10, illustrated in the form of a round baler, is shown to include a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls, which together with a first sidewall 14a (shown in the breakout) behind and generally parallel to cover panel 15 and a second sidewall 14b, collectively forming a bale-forming chamber 20. Cut crop material is picked up by a plurality of tines 31 of a transverse pickup 30 and conveyed through a harvesting assembly into the bale-forming chamber 20 where it is formed into a cylindrically shaped bale by a series of conveyor belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. It should be appreciated that while the baler 10 is illustrated and described as a round baler, in some embodiments the baler 10 is configured as a square baler. Further, it should be appreciated that while the agricultural vehicle 10 is illustrated and described in the form of a baler, in some embodiments the agricultural vehicle 10 is a different type of vehicle, such as a forage harvester.

Figure 2:
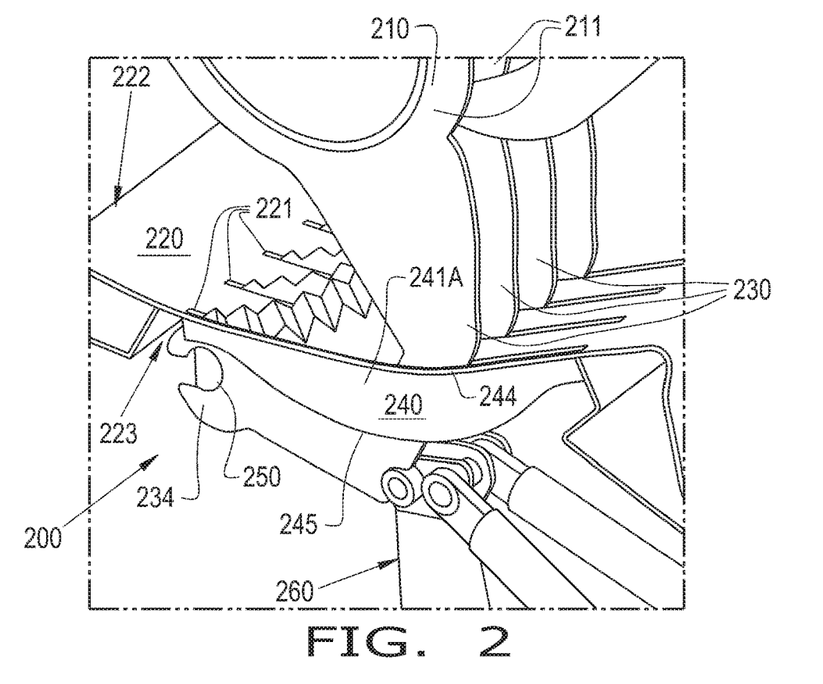
FIG. 2 illustrates a perspective view of the cutting assembly of FIG. 1 with knives in a cutting position.
Figure 3:
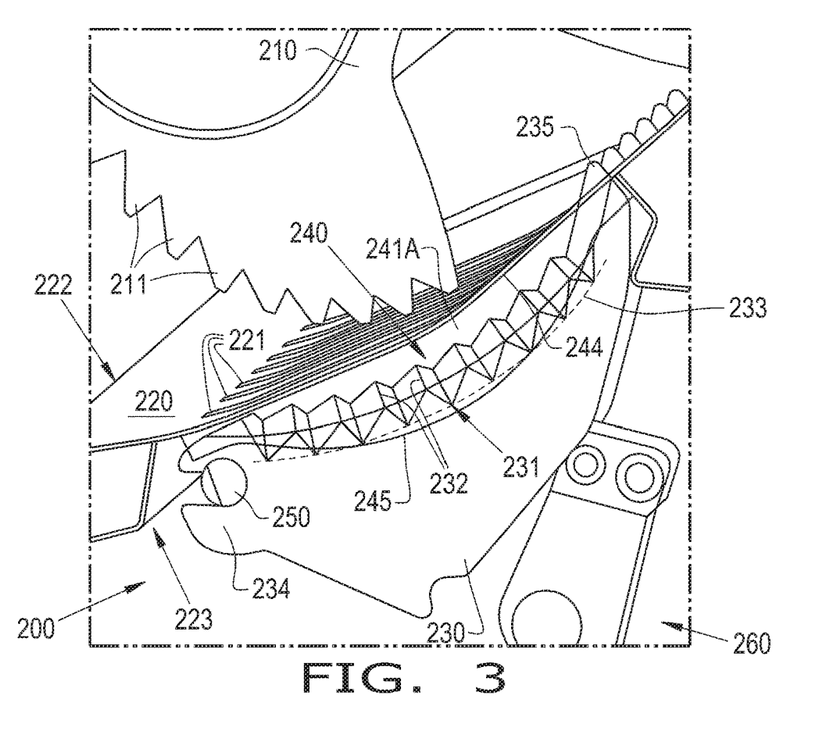
FIG. 3 illustrates the cutting assembly of FIGS. 1-2 with the knives in a retracted position.
Figure 4:
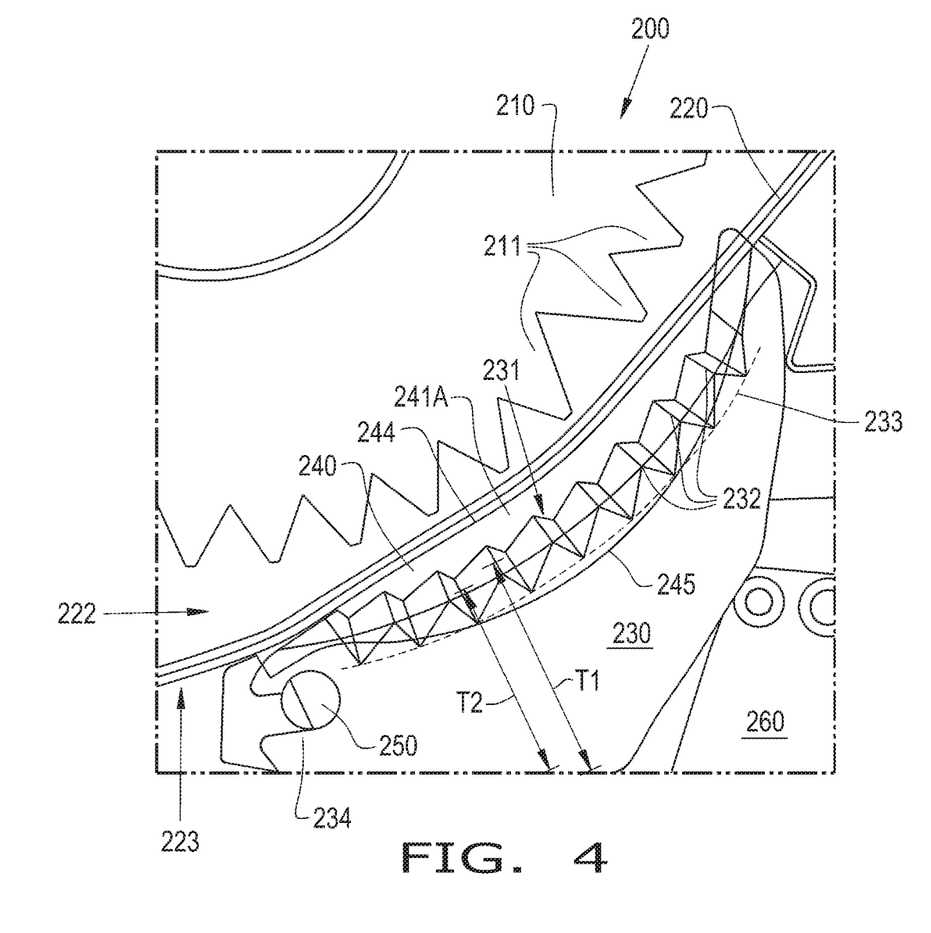
FIG. 4 illustrates a close-up view of a knife of the cutting assembly of FIGS. 1-3.

Referring now to FIGS. 2-4, a cutting assembly 200 that is carried by the chassis and configured to cut crop material conveyed by the pickup 30 is illustrated. The cutting assembly 200 includes a rotatable rotor 210 including a plurality of extensions 211, a rotor floor 220 disposed adjacent to the rotor 210, and a plurality of movable knives 230 disposed adjacent to the rotor floor 220. The rotor floor 220 has a plurality of knife slots 221 formed therein and defines a cutting side 222 on the side of the rotor floor 220 facing the rotor 210 and a shielded side 223 on the opposite side of the rotor floor 220. The knives 230 are movable from a cutting position, illustrated in FIG. 2, to a retracted position, illustrated in FIG. 3. The knives 230 each extend through a respective knife slot 221 into the cutting side 222 to cooperate with the extensions 211 in the cutting position and are disposed on the shielded side 223 such that the knives 230 do not cooperate with the extensions 211 in the retracted position. As used herein, the knives 230 "cooperate" with the extensions 211 in the sense that the knives 230 are in close enough proximity to the extensions 211 and unobstructed so the knives 230 and extensions 211 can act together to cut crop material as the rotor 210 rotates. Conversely, the knives 230 do not "cooperate" with the extensions 211 when in the retracted position because, for example, the rotor floor 220 obstructs co-action of the extensions 211 and the knives 230 to cut crop material. It should be appreciated that the knives 230 may also not cooperate with the extensions 211 when in the retracted position due to a significant spacing between the extensions 211 and the knives 230 that prevents co-action of the extensions 211 and knives 230 to cut crop material. In some embodiments, the knives 230 cooperate with the extensions 211 in the cutting position by scissoring with the extensions 211, so the knives 230 and the extensions 211 co-act together similarly to a pair of scissors.

In known agricultural vehicles, there is a significant risk of trash and debris accumulating on the rotor floor adjacent to where the knives move between the cutting position and the retracted position. When the trash and debris excessively accumulate, function of the knives can be impaired. For example, the trash and debris can become compacted such that movement of the knives against the compacted trash and debris results in deflection of the knives. The deflection may be to such a degree that some of the knives do not move to the cutting position at all, resulting in a significant amount of crop material that is uncut. In extreme cases, the knives may deflect so much that the knives are permanently damaged. To fix the issue, an operator needs to clean out the accumulated trash and debris, which is inconvenient and results in downtime of the vehicle.

Figure 5:
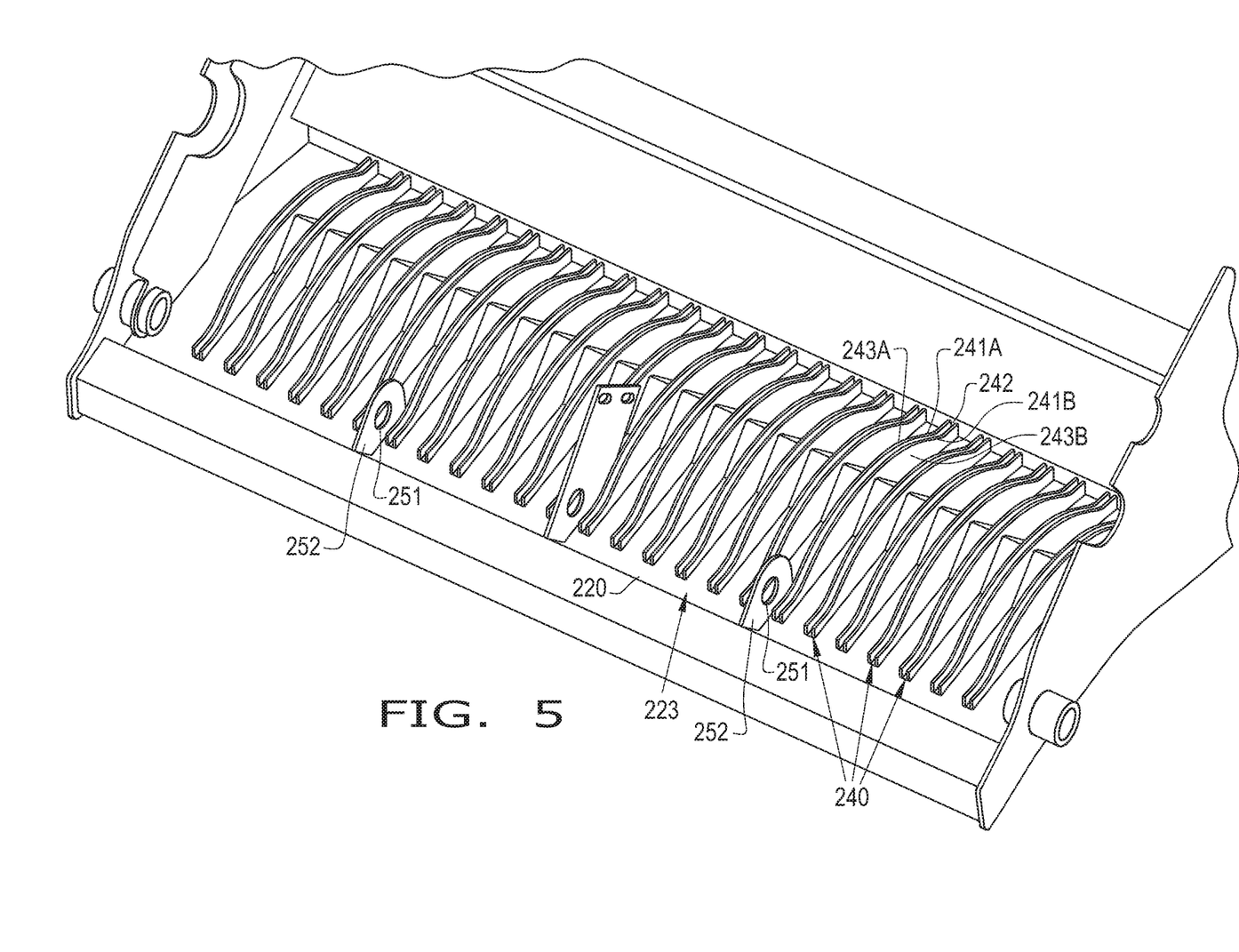
FIG. 5 illustrates a perspective view of a rotor floor of the cutting assembly of FIGS. 1-4 with various elements omitted from view to more clearly illustrate knife guides of the cutting assembly.
Figure 6:
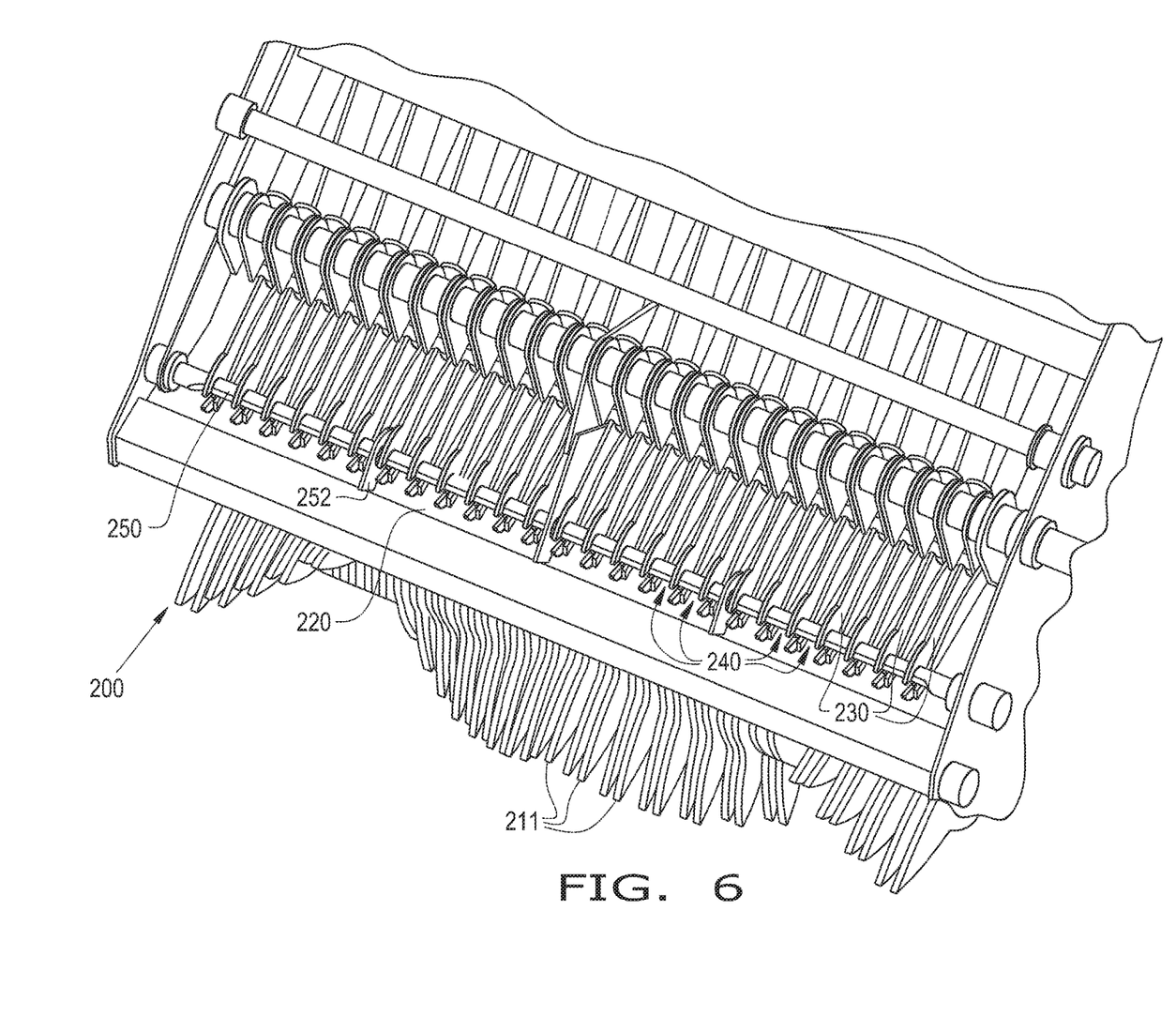
FIG. 6 illustrates a perspective view of the cutting assembly of FIGS. 1-5.
Figure 7:
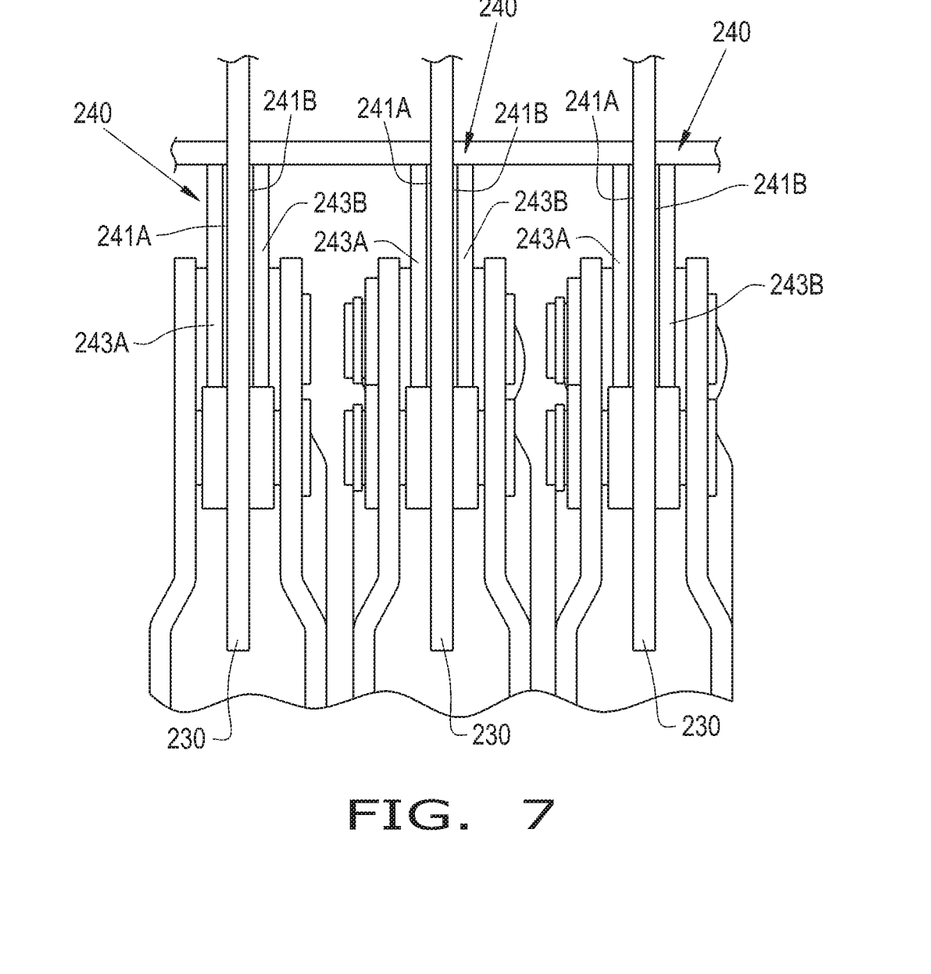
FIG. 7 illustrates a close-up view of knives disposed in gaps of knife guides.
Figure 8:
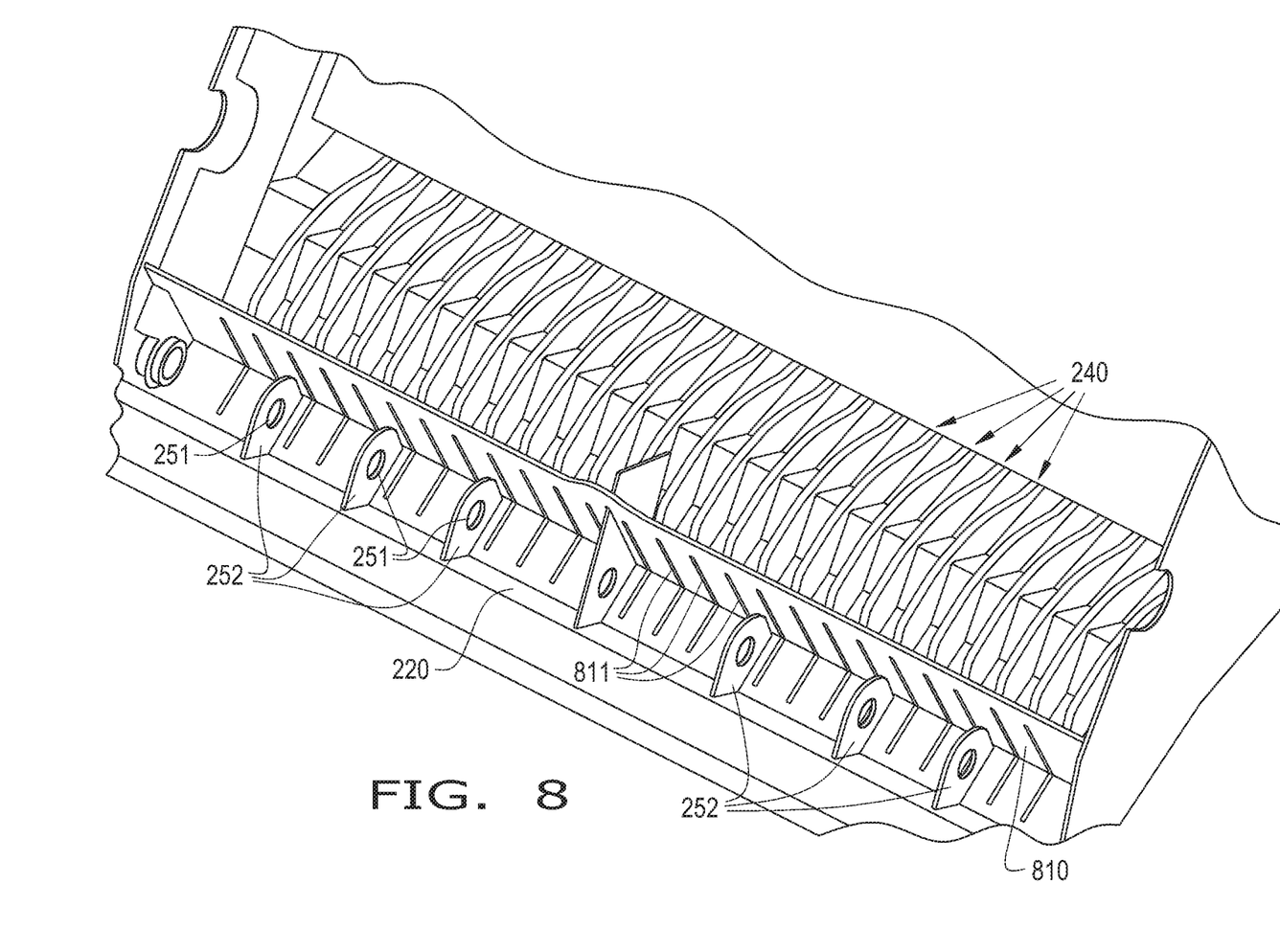
FIG. 8 illustrates a perspective view of the cutting assembly of FIGS. 1-7 including an exemplary embodiment of a pivot guide, with various elements omitted from view to more clearly illustrate the pivot guide.
Figure 9:
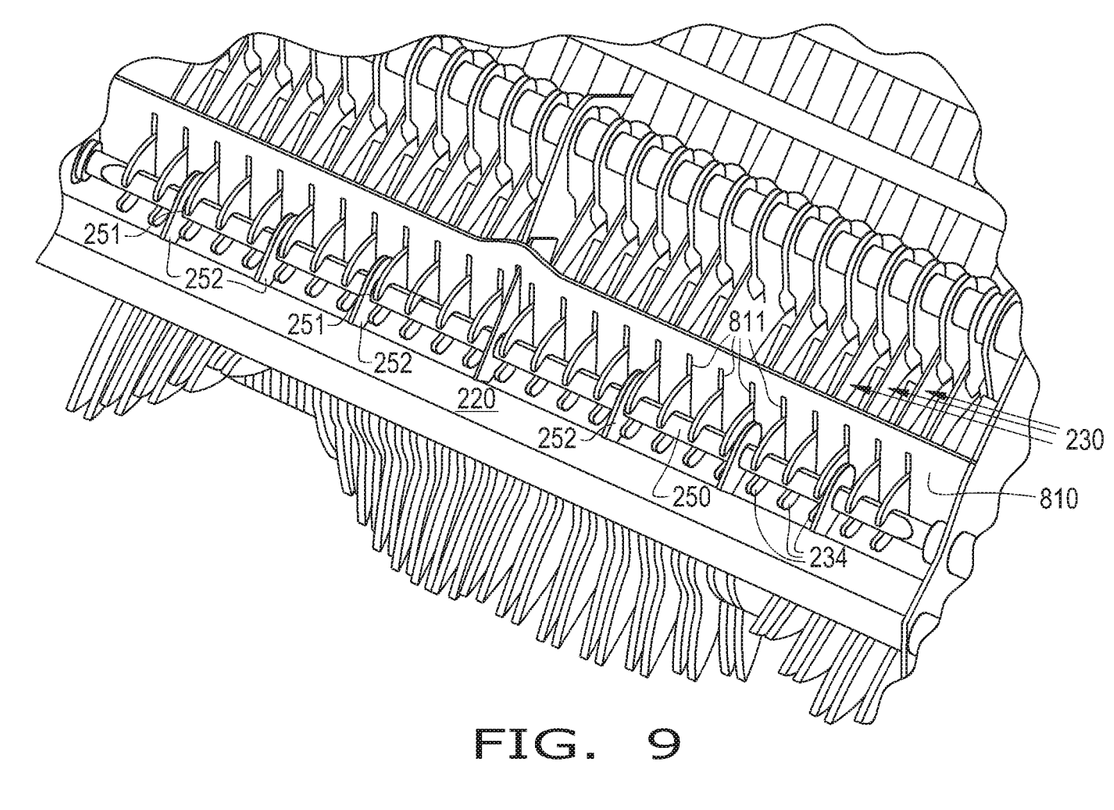
FIG. 9 illustrates a perspective view of the cutting assembly of FIG. 8.
Figure 10:
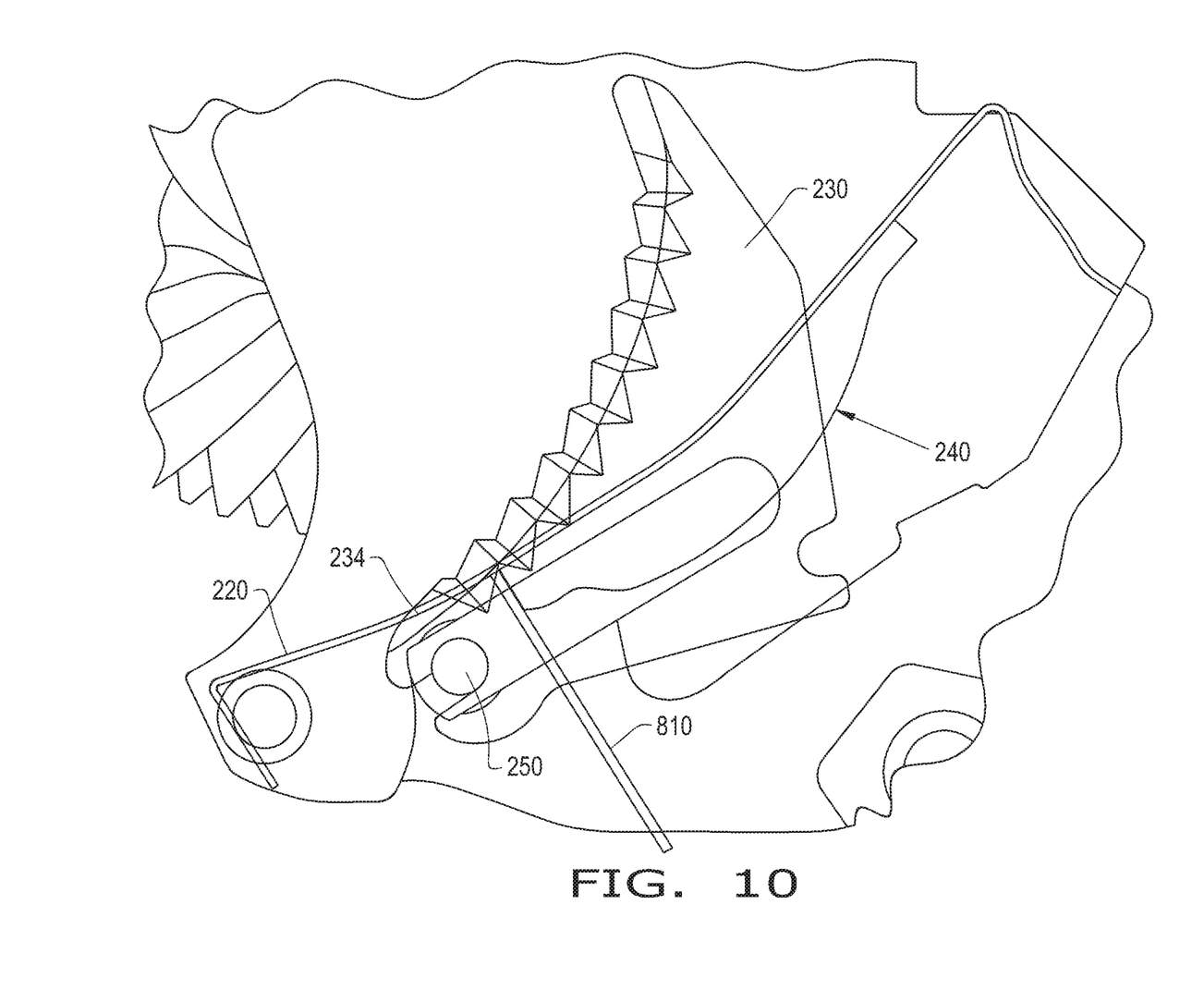
FIG. 10 illustrates a side view of the cutting assembly of FIGS. 8-9.

To address some of the previously described issues, and referring now to FIGS. 5-7 as well, the cutting assembly 200 includes one or more knife guides 240, illustrated as a plurality of knife guides 240, that includes a pair of spaced apart guide surfaces 241A, 241B coupled to the rotor floor 220 on the shielded side 223. For ease of description, only one knife guide is specifically referred to further herein, but it should be appreciated that all of the knife guides 240 may be structured similarly. The guide surfaces 241A, 241B define a gap 242 therebetween such that a respectively associated knife 230 is at least partially disposed in the gap 242 when in the retracted position. By virtue of the knife 230 being disposed in the gap 242 while in the retracted position, the knife 230 is guided between the guide surfaces 241A, 241B when moving to the cutting position, which reduces the risk of the knife 230 deflecting and not moving to the cutting position. In some embodiments, each of the guide surfaces 241A, 241B are part of a respective guide plate 243A, 243B, with the guide plates 243A, 243B paired together to form each of the knife guides 240. In some embodiments with multiple knife guides 240, each of the knife guides 240 may be associated with a respective one of the knives 230 in order to guide the respective knife 230 during its movement between the cutting position and the retracted position.

The gap 242 may define a gap width that is substantially equal to a slot width of the knife slot 221 adjacent to the knife guide 240. By making the gap width of the gap 242 substantially equal to the slot width of the knife slot 221, there is little room between the knife guide 240 and the knife slot 221 for trash and debris to accumulate, which can reduce trash and debris accumulation. Further, restricting the gap width of the gap 242 to be substantially equal to the slot width of the knife slot 221 limits the ability of accumulated trash and debris to "fan out" as it is moved by the moving knife 230. Rather, trash and debris that are moving in the gap 242 tend to scrape and move other trash and debris off the guide surfaces 241A, 241B. In this sense, the knife 230 essentially clears all of the trash and debris from the gap 242 and the knife slot 221 as the knife 230 moves from the retracted position to the cutting position by scraping the trash and debris off the guide surfaces 241A, 241B and forcing the trash and debris out of the gap 242 and the knife slot 221, which also acts to reduce trash and debris accumulation.

The knife guides 240 may be coupled to the rotor floor 220 by, for example, welding the knife guides 240 to the rotor floor 220. The rotor floor 220 may be, in some embodiments, a drop floor of the vehicle 10 that can be pivoted to an open and closed position, as is known. Each of the guide surfaces 241A, 241B may include a first edge 244 that faces the rotor floor 220 and a second edge 245 that is opposite the first edge 244 and defines a convex shape, the significance of which will be described further herein. The first edge 244 may be welded to the rotor floor 220 to integrally couple the guide surfaces 241A, 241B, which may be part of guide plates 243A, 243B, to the rotor floor 220, as illustrated in FIG. 5. It should be appreciated that the knife guides 240 may also be coupled to the rotor floor 220 using, for example, a fastener.

At least one of the guide surfaces 241A, 241B, and in some embodiments both guide surfaces 241A, 241B, of the knife guide 240 defines a curved shape that corresponds to a cutting edge profile 231 (best illustrated in FIGS. 3-4) of the respectively associated knife 230. As used herein, the curved shape of the guide surface(s) 241A, 241B correspond to the cutting edge profile 231 in the sense that the curved shape of the guide surface(s) 241A, 241B is similar to the curve that teeth 232 of the knife 230 follow to define the cutting edge profile 231 or the curved shape allows the guide surface(s) 241A, 241B to fully cover the cutting edge profile 231 when the knife 230 is in the retracted position. As illustrated in FIGS. 3 and 4, for example, the cutting edge profile 231 follows a general curved line, illustrated as dashed line 233. The guide surfaces 241A, 241B have a curved shape, which may be defined by the second edge 245 of the surfaces 241A, 241B, that is generally similar to the curved line 233 of the cutting edge profile 231. In the illustrated embodiment, the second edge 245 defines a convex shape to correspond to the concavity of the cutting edge profile 231 in the knife 230.

By forming the guide surfaces 241A, 241B with the curved shape that corresponds to the cutting edge profile 231 of the knife 230, the knife 230 stays disposed within the gap 242 even after being sharpened repeatedly. As illustrated in FIG. 4, the knife 230 may define a starting knife thickness T1. The starting knife thickness T1 may, for example, be a maximum thickness of the knife 230 corresponding to the knife 230 being generally unused and/or not subsequently sharpened. As is known, the knives 230 of the cutting assembly 200 may be sharpened after a few hours of operation to ensure that the crop material is being cleanly cut. When the cutting edge profile 231 of the knife 230 is sharpened multiple times, the knife 230 is gradually worn down to a sharpened knife thickness T2 that is less than the starting knife thickness T1. As can be appreciated from FIG. 4, the guide surfaces 241A, 241B, owing to their curved shape that corresponds to the cutting edge profile 231, are shaped such that the respectively associated knife 230 stays disposed in the gap 242 after the starting knife thickness T1 has been reduced to the sharpened knife thickness T2. If, instead, the second edges 245 of the guide surfaces 241A, 241B were, for example, straight, rather than convex, some or all of the knife 230 would be disposed outside of the gap 242 when in the retracted position, which leads to the aforementioned problems of trash and debris accumulation interfering with the knife 230 moving between the cutting position and the retracted position. In some embodiments, the guide surfaces 241A, 241B define a curved shape such that the second edges 245 overlap the curved line 233 of the cutting edge profile 231 so the knife 230 is always disposed in the gap 242 so long as the knife 230 has teeth 232. Thus, by shaping the guide surfaces 241A, 241B to be curved, as described, the knife 230 stays disposed within the gap 242 and is guided by the guide surfaces 241A, 241B while moving between the cutting position and the retracted position even after sharpening the knife 230 multiple times.

From the foregoing, it should be appreciated that the knife guides 240 provided according to the present disclosure stabilize the knives 230 during movement of the knives 230 between the cutting position and the retracted position. By keeping the knives 230 in the gap 242 during movement, the knife guides 240 encourage a smooth, controlled movement of the knives 230 between the two positions. Keeping the knives 230 in the gap 242 can also reduce the detrimental effects of lateral torque exerted by the flow of cut crop on the knives 230. Further, the knife guides 240 can limit the ability of trash and debris to accumulate and encourage clearing of the trash and debris during knife movement to reduce the risk of the knives 230 jamming during movement. Even further, one or more of the guide surfaces 241A, 241B of the knife guides 240 can define a curved shape corresponding to a cutting edge profile 231 of the knives 230 so the knives 230 are still at least partially disposed in the gap 242, when in the retracted position, even after being sharpened multiple times. The knife guides 240 provided according to the present disclosure thus reduce the risk of the knives 230 not properly moving during operation of the agricultural vehicle 10.

In some embodiments, and referring now to FIGS. 8-11 as well, the knives 230 each include a pivot region 234 that is configured to pivot about a pivot axis. In the illustrated embodiment, the pivot axis is a pivot rod 250, with the pivot region 234 of each of the knives 230 at least partially surrounding the pivot rod 250 to allow pivotal movement of the knives 230. The pivot rod 250 may, for example, extend through coaxial openings 251 of a plurality of rod supports 252 coupled to the rotor floor 220. In such a configuration, pushing or pulling on the knives 230 causes the pivot region 234 to pivot about the pivot rod 250 and move the knives 230 between the cutting position and retracted position. Movement of the knives 230 may be controlled, for example, by an actuator and/or a cam that acts on a knife tray 260 (illustrated in FIGS. 2-4) to pivot the knives 230.

To encourage smooth pivoting movement of the knives 230, the cutting assembly 200 may include a pivot guide 810

(illustrated in FIGS. 8-10) that includes a plurality of pivot slots 811. Each of the pivot slots 811 are positioned adjacent to the pivot region 234 of a respective knife 230 and hold a portion of the respective knife 230. By providing the pivot guide 810 with the pivot slots 811 adjacent to the pivot region 234, the pivotal movement of the knives 230 are stabilized near the pivot axis (pivot rod 250) to reduce the chance of the knives 230 being laterally moved during operation. The pivot guide 810 may couple to the rotor floor 220 by, for example, welding the pivot guide 810 to the rotor floor 220. Each of the pivot slots 811 may define a pivot slot width that is slightly larger than a knife width of each of the knives 230 so the knives 230 have little, if any, play within the pivot slots 811 during pivotal movement. Stabilizing the knives 230 close to the pivot regions 234, in combination with the previously described knife guides 240, further stabilizes the knives 230 against detrimental effects caused by lateral torque exerted by the flow of cut crop on the knives 230 to promote smooth movement of the knives 230.

Figure 11:
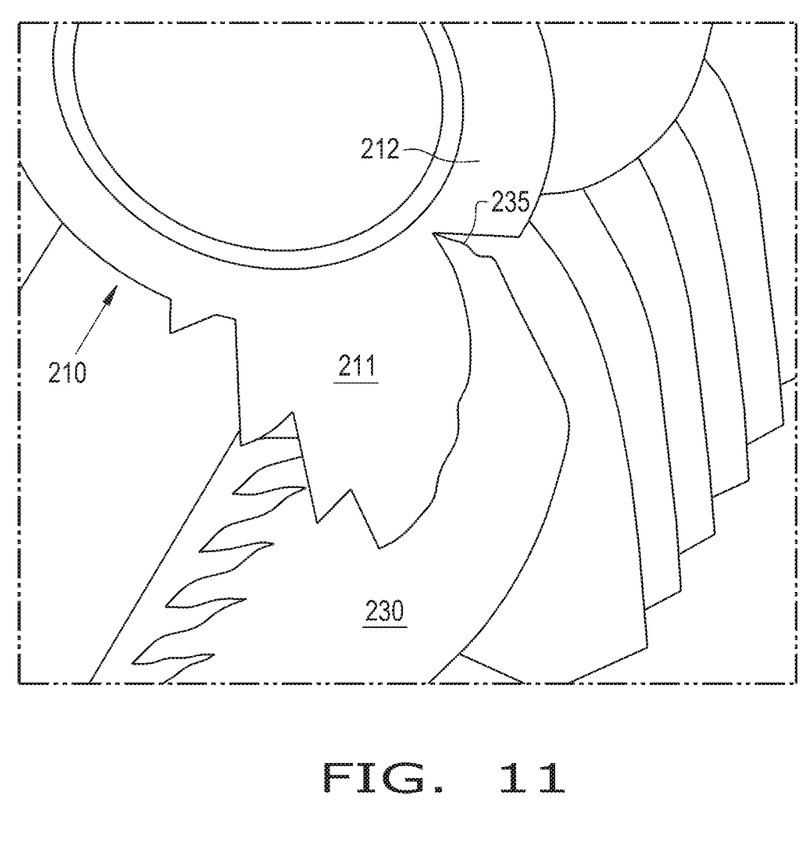
FIG. 11 illustrates a perspective view of the cutting assembly of FIGS. 8-10 with a rotor ring guiding knives of the cutting assembly.

In some embodiments, and referring specifically now to FIG. 11, the rotor 210 includes a rotor ring 212 that is configured to guide the knives 230 as the knives 230 move to the cutting position. Each of the extensions 211 of the rotor 210 may extend from the rotor ring 212. The rotor ring 212 may, for example, come into close proximity and/or contact with a tip 235 of the knives 230 as the knives 230 fully move to the cutting position. In this respect, the tips 235 of the knives 230 may rest against, or be in close proximity to, the rotor ring 212 when fully moved to the cutting position. Using the rotor ring 212 to guide the tips 235 of the knives 230 supports the knives 230 adjacent to the tip 235, which may be the tops of the knives 230. In combination with the pivot guide 810, guiding and supporting the knives 230 with the rotor ring 212 both guides and supports the knives 230 at both ends of the knives 230; the rotor ring 212 guides and supports the knives 230 at the top (near the tips 235) and the pivot guide 810 guides and supports the knives 230 at the bottom (near the pivot regions 234). Guiding and supporting the knives 230 at both ends helps to further reduce the risk of knife damage due to lateral torque exerted on the knives 230 by flow of the cut crop material and the risk of the knives 230 failing to properly move between the retracted position and the cutting position. Guiding and supporting the knives 230 at both ends also can provide improved cut quality by keeping the knives 230 in place during operation, which reduces the risk of cut variation due to wobbling of the knives 230.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A cutting assembly for an agricultural vehicle, comprising:
    a rotatable rotor comprising a plurality of extensions;
    a rotor floor disposed adjacent to the rotor, the rotor floor having a plurality of knife slots formed therein, the rotor floor defining a cutting side on the side of the rotor floor facing the rotor and a shielded side on the opposite side of the rotor floor;
    a plurality of movable knives disposed adjacent to the rotor floor, the knives each being movable from a cutting position to a retracted position, the knives each extending through a respective knife slot into the cutting side to cooperate with the extensions in the cutting position and being disposed on the shielded side such that the knives do not cooperate with the extensions in the retracted position, each of the knives comprising a pivot region configured to pivot about a pivot axis between the cutting position and the retracted position;
    at least one knife guide comprising a pair of spaced apart guide surfaces coupled to the rotor floor on the shielded side and defining a gap therebetween such that a respectively associated knife is at least partially disposed in the gap when in the retracted position; and
    a pivot guide comprising a plurality of pivot slots, each of the pivot slots being positioned adjacent to the pivot region of a respective knife and holding a portion of the respective knife.

2. The cutting assembly of claim 1, wherein the at least one knife guide comprises a plurality of knife guides, each of the knife guides being associated with a respective one of the knives.

3. The cutting assembly of claim 1, wherein the at least one knife guide is welded to the rotor floor.

4. The cutting assembly of claim 1, wherein the respectively associated knife defines a starting knife thickness and the guide surfaces are shaped such that the respectively associated knife stays disposed in the gap after the starting knife thickness has been reduced to a sharpened knife thickness.

5. The cutting assembly of claim 1, wherein each of the guide surfaces comprises a first edge facing the rotor floor and a second edge opposite the first edge, the second edge defining a convex shape.

6. The cutting assembly of claim 5, wherein the first edge of each of the guide surfaces is welded to the rotor floor.

7. The cutting assembly of claim 1, wherein at least one of the guide surfaces defines a curved shape that corresponds to a cutting edge profile of the respectively associated knife.

8. The cutting assembly of claim 1, wherein the knives cooperate with the extensions in the cutting position by scissoring with the extensions.

9. The cutting assembly of claim 1, wherein each of the guide surfaces are part of a respective guide plate.

10. An agricultural vehicle, comprising:
    a chassis;
    a pickup carried by the chassis and configured to convey crop material; and
    a cutting assembly carried by the chassis and configured to cut crop material conveyed by the pickup, the cutting assembly comprising:
    a rotatable rotor comprising a plurality of extensions;
    a rotor floor disposed adjacent to the rotor, the rotor floor having a plurality of knife slots formed therein, the rotor floor defining a cutting side on the side of the rotor floor facing the rotor and a shielded side on the opposite side of the rotor floor;
    a plurality of movable knives disposed adjacent to the rotor floor, the knives each being movable from a cutting position to a retracted position, the knives each extending through a respective knife slot into the cutting side to cooperate with the extensions in the cutting position and being disposed on the shielded side such that the knives do not cooperate with the extensions in the retracted position, each of the knives comprising a pivot region configured to pivot about a pivot axis between the cutting position and the retracted position;

at least one knife guide comprising a pair of spaced apart guide surfaces coupled to the rotor floor on the shielded side and defining a gap therebetween such that a respectively associated knife is at least partially disposed in the gap when in the retracted position; and a pivot guide comprising a plurality of pivot slots, each of the pivot slots being positioned adjacent to the pivot region of a respective knife and holding a portion of the respective knife.

11. The agricultural vehicle of claim 10, wherein the at least one knife guide comprises a plurality of knife guides, each of the knife guides being associated with a respective one of the knives.

12. The agricultural vehicle of claim 10, wherein the at least one knife guide is welded to the rotor floor.

13. The agricultural vehicle of claim 10, wherein the respectively associated knife defines a starting knife thickness and the guide plates are shaped such that the respectively associated knife stays disposed in the gap after the starting knife thickness has been reduced to a sharpened knife thickness.

14. The agricultural vehicle of claim 10, wherein each of the guide surfaces comprises a first edge facing the rotor floor and a second edge opposite the first edge, the second edge defining a convex shape.

15. The agricultural vehicle of claim 14, wherein the first edge of each of the guide surfaces is welded to the rotor floor.

16. The agricultural vehicle of claim 10, wherein at least one of the guide surfaces defines a curved shape that corresponds to a cutting edge profile of the respectively associated knife.

17. The agricultural vehicle of claim 10, wherein the knives cooperate with the extensions in the cutting position by scissoring with the extensions.

18. The agricultural vehicle of claim 10, wherein each of the guide surfaces are part of a respective guide plate.

\* \* \* \* \*